United States Patent
Kitazawa et al.

(10) Patent No.: US 6,896,386 B2
(45) Date of Patent: May 24, 2005

(54) SURFACE EMITTING DEVICE

(75) Inventors: Osamu Kitazawa, Fukushima (JP); Masaaki Takagi, Fukushima (JP)

(73) Assignee: NIDEC COPAL Corporation, Tokyo (JP)

( * ) Notice: Subject to any disclaimer, the term of this patent is extended or adjusted under 35 U.S.C. 154(b) by 0 days.

(21) Appl. No.: 10/356,515

(22) Filed: Feb. 3, 2003

(65) Prior Publication Data

US 2003/0146688 A1 Aug. 7, 2003

(30) Foreign Application Priority Data

Feb. 4, 2002 (JP) .................................. P2002-026704

(51) Int. Cl.⁷ .................................................. F21V 7/00
(52) U.S. Cl. ......................... 362/31; 362/298; 362/330
(58) Field of Search ........................... 362/31, 26, 339, 362/331, 298, 277, 300, 302, 303, 305, 330, 329

(56) References Cited

U.S. PATENT DOCUMENTS

| | | | | |
|---|---|---|---|---|
| 6,206,535 B1 | * | 3/2001 | Hattori et al. ................. | 362/31 |
| 6,461,007 B1 | * | 10/2002 | Akaoka ........................ | 362/31 |
| 6,540,368 B2 | * | 4/2003 | Akaoka ........................ | 362/31 |
| 6,561,660 B2 | * | 5/2003 | Huang .......................... | 362/27 |
| 6,575,584 B1 | * | 6/2003 | Habraken ..................... | 362/31 |
| 6,578,977 B2 | * | 6/2003 | Egawa et al. .................. | 362/31 |
| 6,609,806 B2 | * | 8/2003 | Asakawa et al. .............. | 362/31 |
| 6,631,998 B2 | * | 10/2003 | Egawa et al. .................. | 362/31 |

FOREIGN PATENT DOCUMENTS

| | | |
|---|---|---|
| JP | 2000-314882 | 11/2000 |
| JP | 2001-133775 | 5/2001 |
| JP | 2002-196152 | 7/2002 |

* cited by examiner

Primary Examiner—Thomas M. Sember
(74) Attorney, Agent, or Firm—McGinn & Gibb, PLLC

(57) ABSTRACT

A surface emitting device (A) has a light source (1a) and a light guide plate (2). Members (3) having a function as a reflection portion for reflecting light from the light source (1a) toward a liquid crystal display panel (100) are provided inside the light guide plate (2).

36 Claims, 4 Drawing Sheets

SURFACE EMITTING DEVICE

BACKGROUND OF THE INVENTION

The present invention relates to a surface emitting device for use in a liquid crystal display unit or the like.

A surface emitting device has been proposed as a device for illuminating a liquid crystal display panel or the like. The surface emitting device is called a front light or a back light. The surface emitting device is generally formed in such a manner that a light source is provided on a side face of a light guide plate made of a transparent substrate to introduce light into the light guide plate, and the introduced light is diffused by a reflection portion provided on a surface of the light guide plate, so that the surface emitting device attains face emission. As a typical reflection portion, for example, it has been proposed that fine prism grooves about 10 μm wide or the like are provided.

On the other hand, prism grooves or the like may be contaminated due to fine dust or the like deposited on the prism grooves. Such contamination has influence on the reflection of light from the light source on the prism grooves or the like. Thus, there is a problem that desired surface emission is impeded. Therefore, for example, Japanese Patent Laid-Open No. 2001-133775 proposes that the light guide plate surface is covered with a dustproof cover.

However, when the dustproof cover disclosed in the official gazette is used, there is a gap between the dustproof cover and the light guide plate surface so that the device as a whole is increased in thickness. Thus, a request to make the device thinner cannot be satisfied sufficiently.

SUMMARY OF THE INVENTION

It is therefore an object of the invention to provide a surface emitting device which can be reduced in thickness while a reflection portion in the surface emitting device is prevented from being contaminated.

The invention provides a surface emitting device including a light source and a light guide plate for guiding light from the light source, wherein a reflection portion for reflecting light from the light source toward a target of illumination is provided inside the light guide plate.

In order to solve the aforesaid object, the invention is characterized by having the following arrangement.

(1) A surface emitting device comprising:
 a light source;
 a light guide plate for guiding light from the light source; and
 a reflection portion for reflecting light from said light source toward a target of illumination, which is provided inside the light guide plate.
(2) The surface emitting device according to (1), wherein the light guide plate is constituted by a first member and a second member, which are laminated in surface contact with each other; and
 the reflection portion is constituted by a plurality of linear groove portions provided on the first member in surface contact with the second member.
(3) The surface emitting device according to (2), wherein the first and second members respectively include plate portions laminated with each other, and the plurality of linear groove portions is provided the plate portion of the first member.
(4) The surface emitting device according to (2), wherein the first and second members are made of same material.
(5) The surface emitting device according to (3), wherein a material different in refractive index from the first member and the second member is provided in the groove portions.
(6) The surface emitting device according to (2), wherein each of the first and second members is a plate-shape member as a whole.
(7) The surface emitting device according to (3), wherein a plurality of grooves for reflecting light from the light source are formed on a face of the second member which is perpendicular to the plate portion of the second member.
(8) The surface emitting device according to (3), wherein microlenses for diffusing light from the light source are formed on a face of the second member which is perpendicular to the plate portion of the second member.
(9) The surface emitting device according to (1), wherein the light guide plate is coated with an anti-reflection film.

The present disclosure relates to the subject matter contained in Japanese patent application No. 2002-026704 (filed on Feb. 4, 2002), which is expressly incorporated herein by reference in their entireties.

DETAILED DESCRIPTION OF PREFERRED EMBODIMENTS

Description will be made below on preferred embodiments of the invention with reference to the drawings.

First Embodiment

Figure 1A:
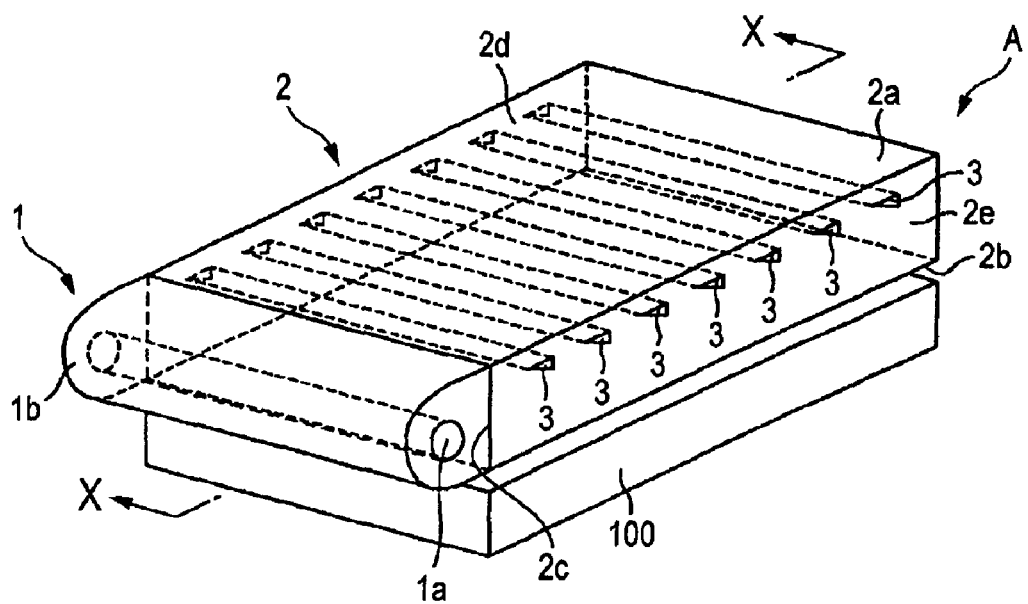
FIG. 1A is a schematic view of a surface emitting device A according to an embodiment of the invention.
Figure 1B:
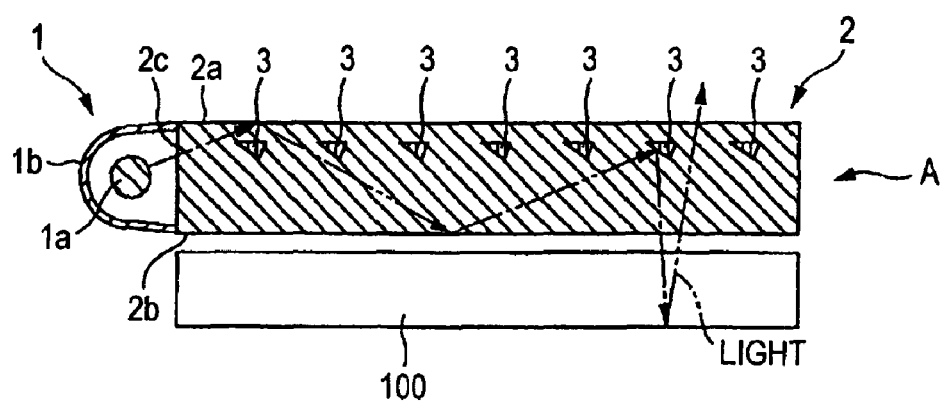
FIG. 1B is a sectional view taken on line X—X in FIG. 1A.

FIG. 1A is a schematic view of a surface emitting device A according to an embodiment of the invention. In addition, FIG. 1B is a sectional view taken on line X—X in FIG. 1A. In this embodiment, description will be made, by way of example, on the case in which a reflective liquid crystal display panel 100 is used as a target of illumination and the surface emitting device A is used as a front light for the liquid crystal display panel 100. However, the invention is not limited to such a case but is applicable to various targets of illumination.

The surface emitting device A has a light source portion 1 and a light guide plate 2.

The light source portion 1 is constituted by a light source 1a and a reflector 1b. The light source 1a is a linear light source such as a cold-cathode tube. The light source 1a is disposed so that its longitudinal direction goes along a side face of the light guide plate 2. The reflector 1b is provided to cover the circumference of the light guide plate 2. The internal surface of the reflector 1b is formed into a mirror surface so that light from the light source 1a enters the light guide plate 2 efficiently.

The light guide plate 2 is a substrate, preferably a transparent substrate, made of optical glass, synthetic resin, or the like. In this embodiment, a rectangular parallelepiped substrate having a top face 2a as a light emergence face for a user viewing the liquid crystal display panel 100, a bottom face 2b disposed opposite to the top surface 2a and serving as a light emergence face for the liquid crystal display panel 100, a side face 2c into which the light from the light source 1a is introduced, and side faces 2d and 2e adjacent to the side face 2c is adopted as the light guide plate 2. Such a straight-sided substrate is optimal for the light guide plate 2. However, the shape of the substrate is not limited to this, but various substrates can be adopted as the light guide plate 2.

A reflection portion for reflecting the light from the light source 1a toward the liquid crystal display panel 100 is provided inside the light guide plate 2. In this embodiment, the reflection portion is constituted by a plurality of rod-like members 3 each having a triangular shape in section. The rod-like members 3 extend in straight lines lying between the side faces 2d and 2e and are provided substantially in parallel with each other. Each member 3 is a member having substantially the same contour as that of each prism groove formed by cutting in the surface of the light guide plate in the related art. Difference between the members 3 and the prism grooves is in that the members 3 are embedded in the light guide plate 2 while the prism grooves are formed by cutting the surface of the light guide plate.

As a result, the light guide plate 2 itself protects the members 3 so that the reflection portion can be prevented from being contaminated. In addition, no dustproof cover has to be provided separately. Thus, the thickness of the surface emitting device A can be reduced.

Incidentally, the members 3 are made of a material different in refractive index from the material of the light guide plate 2, preferably a material lower in refractive index than the light guide plate 2. On the other hand, holes may be provided simply without embedding the members 3 therein. In this case, the air (refractive index 1) is used as an optical reflection medium in place of the members 3.

When the reflection portion is formed of holes penetrating the side surfaces 2d and 2e, it is considered that dust may invade the holes from the side faces 2d and 2e. It is therefore desired to take some measure against the dust. For example, a measure to paste another sheet or plate to each of the side face 2d and 2e is taken. In addition, it is desired to avoid the influence of dew condensation by charging dried air or dried nitrogen into the holes or evacuating the holes.

In addition, the illustrated shape and interval of the members 3 are shown by simplification for the sake of convenience of description. In practice, the respective members 3 are constituted, for example, by surfaces at angles 90°, 45° and 0° to the normal of the top face 2a respectively and 100 $\mu$m deep from the top surface 2a. Then, the members 3 are arranged in parallel to be 10 $\mu$m in width and depth and 250 $\mu$m in pitch.

Incidentally, the configuration of the reflection portion is not limited to this. Various forms as to its shape and arrangement can be considered. For example, dot-like members may be provided in the liquid guide plate 2 in place of the rod-like members 3, so as to diffuse the light from the light source 1a and make the light advance toward the liquid crystal display panel 100.

Next, description will be made on the operation of the surface emitting device A configured thus. Light emitted from the light source 1a and entering the light guide plate 2 is reflected by the top surface 2a or the bottom surface 2b of the light guide plate 2. The reflected light is propagated through the light guide plate 2 to reach the members 3 constituting the reflection portion, and subjected to total reflection or Fresnel reflection. As a result, the light emerges from the bottom face 2b so as to illuminate the liquid crystal display panel 100. Since the liquid crystal display panel 100 is reflective, the light emerging from the bottom surface 2b is reflected by the liquid crystal display panel 100 so as to enter the light guide plate 2 again. After that, the light emerges from the top face 2a. In FIG. 1B, the arrows show an example of the course of the light.

Next, description will be made on an example of the method for manufacturing the light guide plate 2. For example, by laser beam or the like, holes in which the members 3 are to be embedded may be made from a side surface of a rectangular parallelepiped substrate forming the light guide plate 2. After that, the members 3 are inserted into the holes or liquid members 3 are poured into the holes and solidified. Alternatively, a liquid raw material of the light guide plate 2 may be poured into a mold capable of forming holes in which the members 3 are to be embedded. Thus, the light guide plate 2 is made up. Then, the members 3 are placed into the holes.

Second Embodiment

Figure 2A:
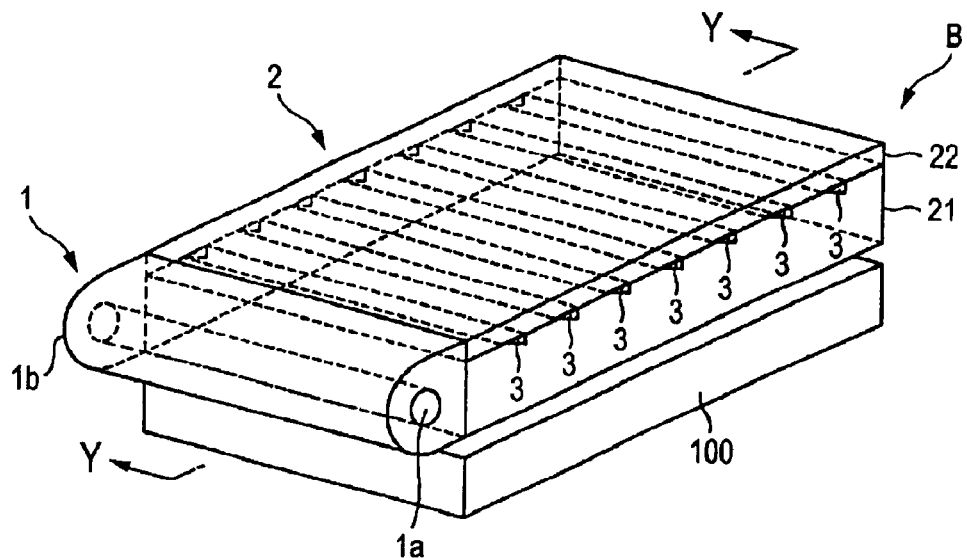
FIG. 2A is a schematic view of a surface emitting device B according to another embodiment of the invention.
Figure 2B:
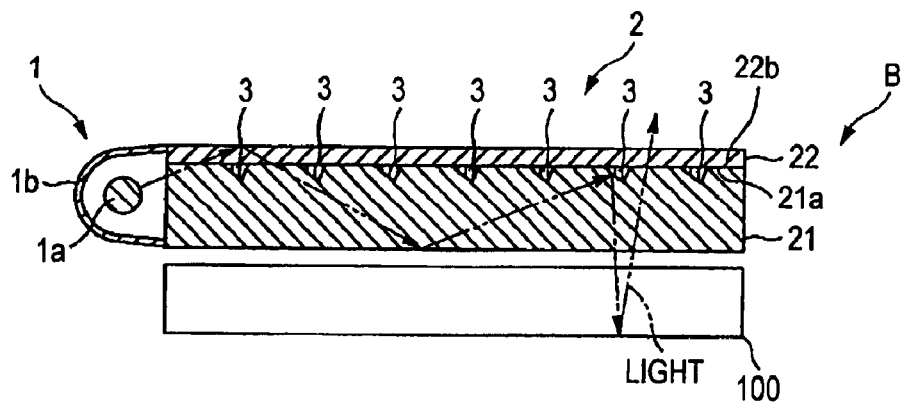
FIG. 2B is a sectional view taken on line Y—Y in FIG. 2A.

FIG. 2A is a schematic view of a surface emitting device B according to another embodiment of the invention. In addition, FIG. 2B is a sectional view taken on line Y—Y in FIG. 2A. The surface emitting device B according to this embodiment is different from the surface emitting device A in terms of the configuration of the light guide plate 2.

The light guide plate 2 in the surface emitting device B is formed by lamination of a first member 21 and a second member 22. The first member 21 and the second member 22 form a plate-like rectangular parallelepiped as a whole. The first member 21 and the second member 22 are laminated integrally so that a top face 21a of the first member 21 is in face contact with a bottom surface 22b of the second member 22.

As a reflection portion of the light guide plate 2, grooves are formed in the top surface 21a of the first member 21, and members 3 as described previously are provided in the grooves. The members 3 are formed so that their top surfaces are flush with the top surface 21a of the first member 21, while the bottom surface 22b of the second member 22 is laminated in surface contact with the top surface 21a of the first member 21 with no space therebetween.

When the light guide plate 2 is formed by lamination of the two members, the members 3 as a reflection portion are designed to be substantially embedded inside the light guide plate 2. Thus, the second member 22 has a function as a cover for preventing the members 3 from being contaminated. As a result, the second member 22 exerts an effect similar to that in the first embodiment.

Incidentally, although the embodiment has shown the case in which the members 3 are provided, not to say, the invention may be applicable to the case in which prism grooves are provided simply in the top surface 21a of the first member 21 without providing the members 3 and the air is used as a reflection medium instead.

The first member 21 and the second member 22 are preferably formed of materials having the same refractive index. Particularly when both the first and second members 21 and 22 are formed of the same material, light reflection in the interface between the first and second members 21 and 22 can be suppressed to a substantially negligible extent. Incidentally, in this embodiment, description has been made, by way of example, on the case in which each of the first member 21 and the second member 22 is shaped like a plate as a whole. Needless to say, the invention is also applicable to the case in which members having other shapes but still having such plate-like portions are adopted.

Next, description will be made on an example of the method for manufacturing the light guide plate 2 according to the embodiment. For example, when prism grooves are molded in the first member 21 in a manner known in the related art, and the members 3 are attached to the prism grooves, the second member 22 is laminated to the first member 21 after the members 3 are attached. The first and second members 21 and 22 can be laminated, for example, in a method such as bonding with a bonding agent, thermo compression bonding or ultrasonic deposition. In the case of bonding with a bonding agent, it is desired to use a bonding agent having refractive index the same or close to that of the first member 21 or the second member 22. Thus, light reflection in the interface can be suppressed. Preferably the first member 21, the second member 22 and the bonding agent are made of one and the same material such as acrylic resin or polycarbonate resin.

The light guide plate 2 according to this embodiment has an advantage that it can be manufactured easily. In addition, the first member 21 has substantially the same configuration as a light guide plate in the related art. Accordingly, by using an existing light guide plate and laminating the second member 22 to the existing light guide plate, there is another advantage that the configuration in which a reflection portion is provided inside the light guide plate can be attained.

Third Embodiment

Figure 3:
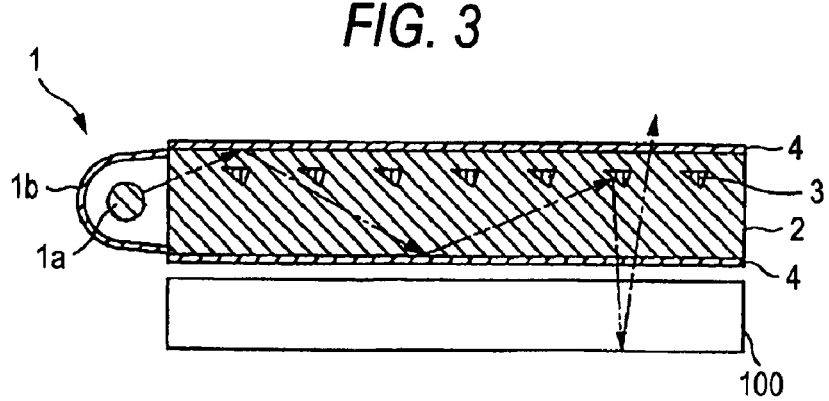
FIG. 3 is a sectional view showing an embodiment in which an anti-reflection film is provided in the surface emitting device A according to the first embodiment.

For preventing external light from being reflected from the light guide plate surface, it is desired to provide an anti-reflection film. FIG. 3 is a sectional view showing a third embodiment in which an anti-reflection film is provided in the surface emitting device A according to the first embodiment.

In the embodiment of FIG. 3, each of the top face 2a and the bottom face 2b of the light guide plate 2 is coated with an anti-reflection film (AR coat). Thus, disturbing light is reflected by the top face 2a and the bottom face 2b so that the contrast can be prevented from being lowered.

Fourth Embodiment

Figure 4A:
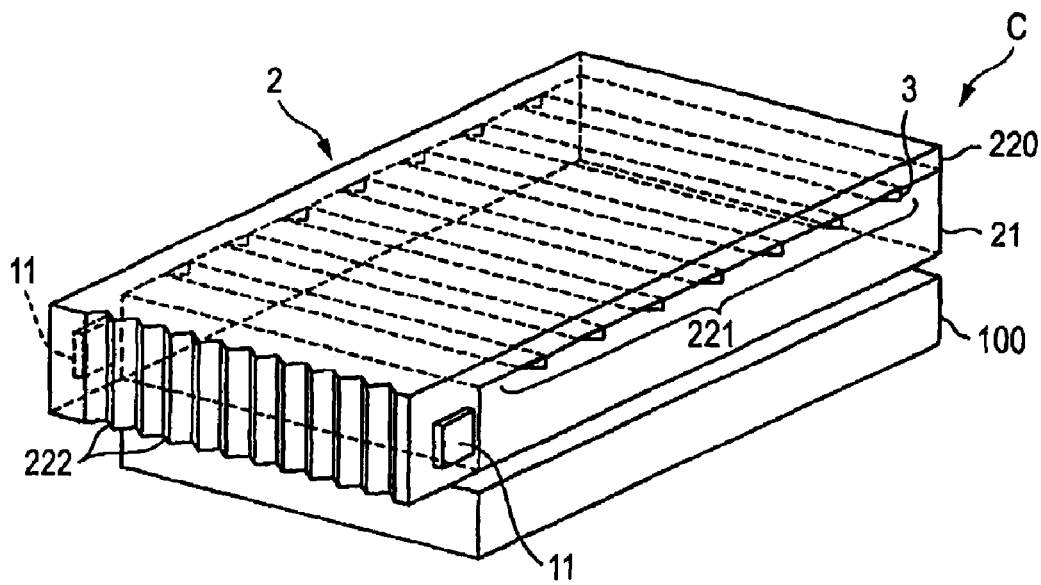
FIG. 4A is a schematic view of a surface emitting device C according to another embodiment of the invention.
Figure 4B:
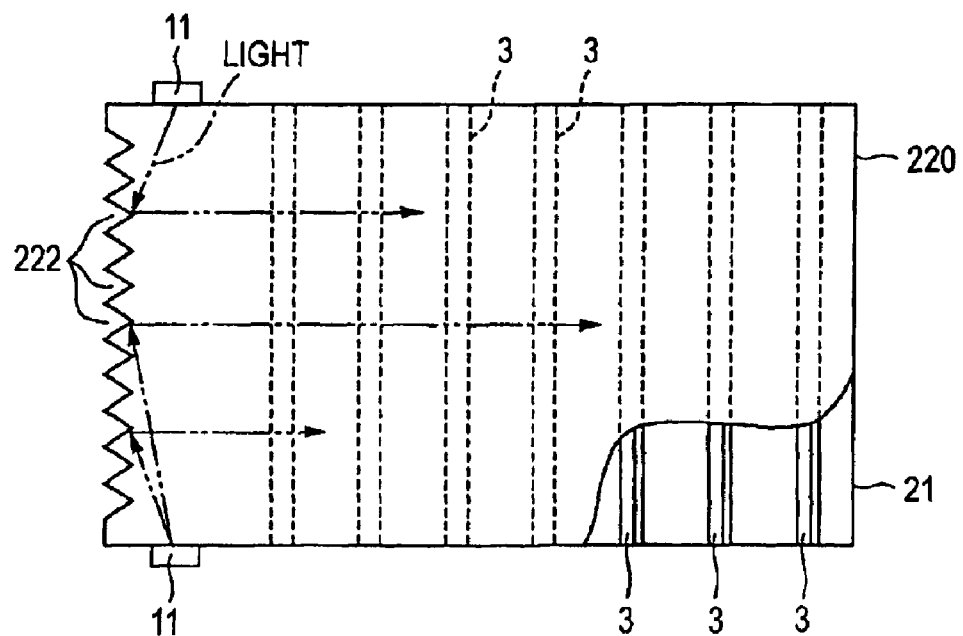
FIG. 4B is a partially broken plan view of the surface emitting device C.

FIG. 4A is a schematic view of a surface emitting device C according to a fifth embodiment of the invention. In addition, FIG. 4B is a partially broken plan view of the surface emitting device C. The surface emitting device C according to this embodiment belongs to the type in which two members are laminated to form a light guide plate as in the surface emitting device B. However, this embodiment shows the mode in which point light sources such as LEDs are adopted as a light source in place of the linear light source.

Schematically, the surface emitting device C has the following configuration. That is, in addition to a first reflection portion for reflecting light toward the liquid crystal display panel 100, a second reflection portion for reflecting light from the point light sources is provided in the light guide plate. More specifically, by the second reflection portion, the light from the point light sources is converted into parallel light similar to the light emitted from a linear light source used. Thus, the light is reflected toward the reflection portion for reflecting the light toward the liquid crystal display panel 100.

In this embodiment, the light guide plate 2 is constituted by lamination of a first member 21 and a second member 220. The first member 21 is similar to the first member 21 in the surface emitting device B according the second embodiment, so that the first reflection portion is formed as the members 3 on the top face of the first member 21. Needless to say, prism grooves may be simply formed without provision of the members 3 like the description made in the second embodiment.

The second member 220 has an L-shape and is laminated to the first member 21 so that the top surface of the first member 21 is in face contact with the bottom surface of a plate-like portion 221 on the long side of the second member 220. Thus, the light guide plate 2 is formed into a substantially rectangular parallelepiped as a whole. Point light sources 11 are disposed on the two opposite side faces on the short side of the second member 220. In addition, a plurality of grooves 222 are formed in one of the rest side faces adjacent to these side faces.

The grooves 222 are provided to reflect the light from the light sources 11 toward the members 3 as shown in FIG. 4B. In this embodiment, prism grooves each having a triangular shape in section are adopted. The principle of reflection is the same as the prism grooves provided in the light guide plate for reflecting light toward the liquid crystal display panel 100.

The light from the light sources 11 is reflected toward the members 3 by the grooves 222 designed thus. Thus, light emission similar to the light emission from the linear light source 1a used as described in the first and second embodiments can be attained even by use of the point light sources 11. In this embodiment, when the second member 220 is formed thus, both the function of protecting the members 3, and light emission similar to the light emission from a linear light source but attained by use of point light sources are realized by the second member 220.

Fifth Embodiment

Figure 5:
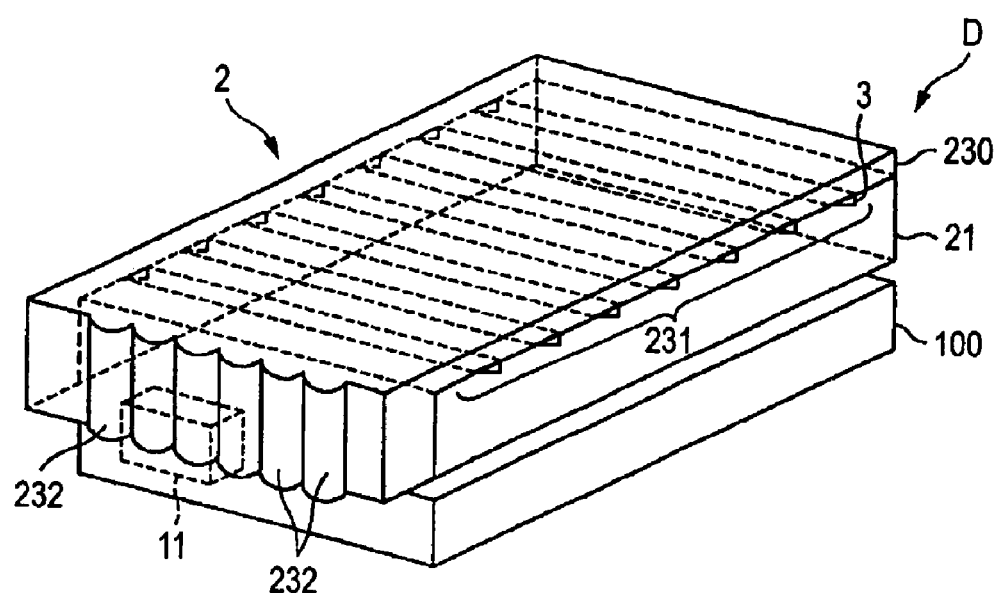
FIG. 5 is a schematic view of a surface emitting device D according to another embodiment of the invention.

FIG. 5 is a schematic view of a surface emitting device D according to another embodiment of the invention. The surface emitting device D according to this embodiment adopts a point light source as a light source in the same manner as in the surface emitting device C, except that microlenses are adopted in place of the grooves 222 in the surface emitting device C.

In this embodiment, the light guide plate 2 is constituted by lamination of a first member 21 and a second member 230. The first member 21 is similar to the first member 21 in the surface emitting device B according the second embodiment so that the reflection portion is formed as the members 3 on the top surface of the first member 21. Needless to say, prism grooves may be simply formed without provision of the members 3 like the description made in the second embodiment.

The second member 230 has substantially the same outer shape as that of the second member 220 in the fourth embodiment. That is, the second member 230 has an L-shape and is laminated to the first member 21 so that the top surface of the first member 21 is in surface contact with the bottom surface of a plate-like portion 231 on the long side of the second member 230. Thus, the light guide plate 2 is formed into a substantially rectangular parallelepiped as a whole.

A plurality of microlenses 232 are provided on the illustrated left side surface of the second member 230 in FIG. 5, and a point light source 11 is disposed opposite to the microlenses 232. In this embodiment, each of the microlenses 232 has a semicircular shape in section and is disposed like a semicircular column extending in the up/down direction. Although the microlenses 232 are designed thus in this embodiment, various forms as to their shape and arrangement can be selected.

When the microlenses 232 are provided thus, light from the light source 11 entering the light guide plate 2 is dispersed so that the distribution of light in the light guide plate 2 is made uniform. In this embodiment, when the second member 230 is formed thus, both the function of protecting the members 3 and the uniform distribution of light from a point light source in the light guide plate 2 are realized by the second member 230.

As described above, a surface emitting device according to the invention can be reduced in thickness while a reflection portion in the surface emitting device is prevented from being contaminated.

What is claimed is:

1. A surface emitting device comprising:
    a light source;
    a light guide plate for guiding light from the light source; and
    a reflection portion for reflecting light from said light source toward a target of illumination, which is provided inside the light guide plate;
    wherein the light guide plate comprises a first member and a second member, which are laminated in surface contact with each other, and
    wherein the reflection portion comprises a plurality of linear groove portions and a plurality of flat portions adjacent thereto provided on the first member in surface contact with the second member.

2. The surface emitting device according to claim 1, wherein the first and second members respectively include plate portions laminated with each other, and the plurality of linear groove portions is provided on the plate portion of the first member.

3. The surface emitting device according to claim 2, wherein different in refractive index from the first member and the second member is provided in a material the groove portions.

4. The surface emitting device according to claim 2, wherein a plurality of grooves for reflecting light from the light source are formed on a face of the second member which is perpendicular to the plate portion of the second member.

5. The surface emitting device according to claim 2, wherein microlenses for diffusing light from the light source are formed on a face of the second member which is perpendicular to the plate portion of the second member.

6. The surface emitting device according to claim 1, wherein the first and second members comprise a same material.

7. The surface emitting devise according to claim 1, wherein each of the first and second members comprises a plate-shape member as a whole.

8. The surface emitting device according to claim 1, wherein the light guide plate is coated with an anti-reflection film.

9. The surface emitting device according to claim 1, wherein the second member comprises a planar surface in surface contact with the surface of the first member.

10. The surface emitting device according to claim 1, wherein the second member comprises a planar surface in surface contact with the plurality of flat portions of the first member.

11. The surface emitting device according to claim 1, wherein the light guide plate comprises a plate-shaped parallelepiped substrate.

12. The surface emitting device according to claim 1, wherein the first member and the second member form a plate-shaped parallelepiped substrate.

13. The surface emitting device according to claim 1, wherein the reflection portion is embedded in the light guide plate.

14. The surface emitting device according to claim 1, wherein the light source comprises a linear light source.

15. The surface emitting device according to claim 1, wherein the source comprises a point light source.

16. The surface emitting device according to claim 15, wherein a the light point light source comprises at least one LED.

17. The surface emitting device according to claim 15, wherein the point light source is disposed on at least one side surface of the second member.

18. The surface emitting device according to claim 15, wherein the point light source comprises point light sources disposed on opposite side faces of the second member.

19. The surface emitting device according to claim 15, wherein a face of the second member which is perpendicular to the plate portion of the second member comprises a plurality of grooves for reflecting light from the point light source toward the plurality of grooves.

20. The surface emitting device according to claim 1, wherein the plurality of grooves comprise prism grooves.

21. The surface emitting device according to claim 1, further comprising members disposed in the plurality of grooves.

22. The surface emitting device according to claim 21, wherein the members comprise a material different in refractive index from the first member and the second member.

23. The surface emitting device according to claim 1, wherein the plurality of grooves contain air.

24. The surface emitting device according to claim 1, wherein the plurality of flat portions comprise transparent portions through which the light reflected from the target of illumination is passed.

25. A surface emitting device comprising:
    a light source;
    a light guide plate for guiding light from the light source; and
    a reflection portion for reflecting light from said light source toward a target of illumination, said reflection portion being disposed inside the light guide plate,
    wherein the light guide plate comprises a first member in surface contact with a second member, and
    wherein the second member overlaps at least a portion of an end surface of the first member.

26. The surface emitting device according to claim 25, wherein the reflection portion comprises a plurality of groove portions on a surface of the first member in surface contact with the second member.

27. The surface emitting device according to claim 26, wherein the second member comprises a planar surface in surface contact with the surface of the first member.

28. The surface emitting device according to claim 25, wherein the first and second members respectively include plate portions superimposed on each other.

29. The surface emitting device according to claim 25, wherein the second member comprises an L-shaped longitudinal cross-section,
    wherein a first portion of the second member is in surface contact with a top surface of the first member, and
    wherein a second portion of the second member is in surface contact with the end surface of the first member.

30. The surface emitting device according to claim 25,
    wherein the first member comprises:
        at least one planar surface; and
        at least one end surface; and
    wherein the second member comprises:
        at least one planar portion having a planar surface opposed to the at least one planar surface of the first member; and an end portion having a thickness, in a direction substantially orthogonal to the planar surface of the second member, greater than a thickness of the at least one planar portion.

31. The surface emitting device according to claim 30, wherein an inside face of the end portion of the second member opposes and contacts at least a portion of the at least one end surface of the first member.

32. The surface emitting device according to claim 30, wherein the reflection portion is formed on at least one of the at least one planar surface of the first member and the at least one planar surface of the second member.

33. The surface emitting device according to claim 30, wherein the reflection portion comprises a plurality of groove portions on at least one of the at least one planar surface of the first member and the at least one planar surface of the second member.

34. A surface emitting device comprising:

a light source;

a light guide plate for guiding light from the light source;

a first reflection portion for reflecting light from said light source toward a target of illumination, which is provided inside the light guide plate; and a second reflection portion for reflecting light from said light source toward said first reflection portion.

35. A surface emitting device comprising:

a light source;

means for guiding light from the light source; and means for reflecting light from said light source toward a target of illumination, said means for reflecting being embedded inside the means for guiding, wherein the means for guiding comprises a first member in surface contact with a second member, and wherein the second member overlaps at least a portion of an end surface of the first member.

36. A surface emitting device comprising:

a light source;

means for guiding light from the light source;

first means for reflecting Light from said light source toward a target of illumination, said first means for reflecting being disposed inside the means for guiding;and second means for reflecting light from said light source toward said first reflection portion, wherein said second means for reflecting interposes the light source and said first means for reflecting.

\* \* \* \* \*